(12) United States Patent
Yasen et al.

(10) Patent No.: US 9,194,989 B2
(45) Date of Patent: Nov. 24, 2015

(54) IODINE POLARIZING FILM, METHOD OF PRODUCING THE SAME, AND POLARIZING PLATE COMPRISING THE SAME

(75) Inventors: Muniriding Yasen, Ibaraki (JP); Hiroaki Mizushima, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 1039 days.

(21) Appl. No.: 13/124,887

(22) PCT Filed: Oct. 27, 2009

(86) PCT No.: PCT/JP2009/068377
§ 371 (c)(1),
(2), (4) Date: Apr. 19, 2011

(87) PCT Pub. No.: WO2010/061706
PCT Pub. Date: Jun. 3, 2010

(65) Prior Publication Data
US 2011/0205628 A1 Aug. 25, 2011

(30) Foreign Application Priority Data
Nov. 27, 2008 (JP) ................................ 2008-303015

(51) Int. Cl.
*G02B 5/30* (2006.01)
*B29D 11/00* (2006.01)

(52) U.S. Cl.
CPC ........ *G02B 5/3033* (2013.01); *B29D 11/00644* (2013.01)

(58) Field of Classification Search
None
See application file for complete search history.

(56) References Cited

U.S. PATENT DOCUMENTS

| | | | |
|---|---|---|---|
| 4,166,871 A * | 9/1979 | Schuler | 427/163.1 |
| 4,859,039 A * | 8/1989 | Okumura et al. | 359/487.02 |
| 6,855,276 B2 * | 2/2005 | Kondo et al. | 264/1.34 |
| 2002/0113922 A1 | 8/2002 | Kusumoto et al. | |
| 2003/0067683 A1 | 4/2003 | Tsuchimoto et al. | |
| 2004/0212885 A1 | 10/2004 | Mizushima et al. | |
| 2007/0111017 A1 * | 5/2007 | Masuda et al. | 428/500 |
| 2007/0269616 A1 | 11/2007 | Nakano et al. | |

FOREIGN PATENT DOCUMENTS

| | | |
|---|---|---|
| CN | 101075000 A | 11/2007 |
| CN | 101201423 A | 6/2008 |
| JP | 11-049878 A | 2/1999 |
| JP | 2001-091736 A | 4/2001 |
| JP | 2002-174728 A | 6/2002 |
| JP | 2003-98344 A | 4/2003 |
| JP | 2004-341515 A | 12/2004 |
| JP | 2006-276236 A | 10/2006 |
| JP | 2007-41280 A | 2/2007 |
| JP | 2007-233243 A | 9/2007 |
| JP | 2007-328252 A | 12/2007 |
| JP | 2008-26637 A | 2/2008 |
| JP | 2008-40251 A | 2/2008 |
| JP | 2008-145919 A | 6/2008 |

OTHER PUBLICATIONS

English translation of JP 2006-276236A, Oct. 12, 2006.*
International Search Report of PCT/JP2009/068377, mailing date Nov. 24, 2009.
Notification of Transmittal of Translation of the International Preliminary Report on Patentability (Form PCT/IB/388) of International Application No. PCT/JP2009/068377 mailed Jul. 14, 2011 with forms PCT/IB/373 and PCT/ISA/237.
Chinese Office Action dated Jan. 8, 2014, issued in corresponding Chinese Patent Application No. 200980139892.0 with English Translation. (8 pages).
Chinese Office Action dated Jun. 18, 2013, issued in corresponding Chinese Patent Application No. 200980139892.0 with English translation (12 pages).
Chinese Office Action dated Oct. 8, 2012, issued in corresponding Chinese Patent Application No. 200980139892.0, (8 pages). With English Translation.
Japanese Office Action dated Aug. 23, 2012, issued in corresponding Japanese patent application No. 2008-303015, w/ English translation.
Taiwanese Office Action dated Jun. 25, 2014, issued in corresponding Taiwanese Patent Application No. 098138804, with English translation (9 pages).
Chinese Office Action dated Jul. 10, 2014, issued in corresponding Chinese Patent Application No. 200980139892.0, with English translation (14 pages).
Office Action dated Jun. 19, 2015, issued in counterpart Korean Patent Application No. 10-2011-7004982, with English translation (12 pages).

* cited by examiner

*Primary Examiner* — Arnel C Lavarias
(74) *Attorney, Agent, or Firm* — Westerman, Hattori, Daniels & Adrian, LLP

(57) ABSTRACT

An iodine polarizing film includes a polymer film and iodine adsorbed and oriented on the polymer film, wherein an iodine content of the polarizing film is within the range of 1.9 to 3% by weight per 2.85 $mm^3$, a single transmittance of the polarizing film is within the range of 43 to 45%, and a ratio (A2/A1) of a crossed absorbance A2 at a wavelength of 610 nm to a crossed absorbance A1 at a wavelength of 480 nm is 1.16 or less.

10 Claims, No Drawings

IODINE POLARIZING FILM, METHOD OF PRODUCING THE SAME, AND POLARIZING PLATE COMPRISING THE SAME

TECHNICAL FIELD

The invention relates to an iodine polarizing film for use in an image displays such as a liquid crystal display, an electroluminescence (EL) display, a plasma display (PD), or a field emission display (FED), and to a method for production thereof. The invention also relates to a polarizing plate including the polarizing film.

BACKGROUND ART

A polarizing film for use in an image display (particularly, liquid crystal display) is required to have both high transmittance and high degree of polarization in order to provide bright images with high color reproducibility. Such a polarizing film is conventionally produced by a process including allowing a polyvinyl alcohol film (hereinafter referred to as "PVA film") to swell with swelling water and then adsorbing and orienting iodine having dichroism or a dichroic material such as a dichroic dye in a dyeing step, and performing uniaxial stretching (Patent Document 1 below).

In the general production method mentioned above, however, stretching is performed while immersion in a dyeing liquid is performed in the dyeing step, which may result in excessive adsorption of iodine or the dichroic dye on the PVA film. This may cause a problem in which the orientation of the adsorbed iodine or the like is degraded so that the resulting polarizing film can cause light leakage in the short wavelength region (380-410 nm) of visible light (380-780 nm).

The method described in Patent Document 2 below is a method for producing a polarizing film having a high degree of orientation and prevented from the light leakage. This production method includes subjecting a PVA film to dry stretching, then adsorbing and orienting iodine or a dichroic dye, and then stretching the film while immersing it in an aqueous boric acid solution. Examples of the dry stretching described include general methods such as a uniaxial stretching method using a heating roller and a roll-to-roll uniaxial stretching method in which stretching is performed between rolls placed in an heating oven, while a tensile force is applied.

In the above production method, however, there is some difficulty in adsorbing a sufficient amount of iodine or the like onto the PVA film, because the PVA film is heated, dry-stretched to a stretching ratio of about 4 to 5 times, and subjected to the dyeing step without being subjected to a swelling step. In the above production method, therefore, it is difficult to produce a polarizing film with a high degree of polarization. There is also a problem in which the PVA film may be ruptured when the PVA film is stretched to a high stretching ratio in the aqueous boric acid solution so that the polarizing properties can be improved.

PRIOR ART DOCUMENTS

Patent Documents

Patent Document 1: JP A No. 2004-341515
Patent Document 2: JP-A No. 11-49878

SUMMARY OF THE INVENTION

Problems to be Solved by the Invention

The invention has been made in view of the above problems, and an object of the invention is to provide an iodine polarizing film that has good optical properties and increased optical absorption in the short wavelength region (380-410 nm) of visible light (380-780 nm) so that it can be prevented from causing light leakage in the short wavelength region, and to provide a method for production thereof.

Means for Solving the Problems

The inventors have accomplished the invention based on the finding that the optical absorption in the short wavelength region of visible light can be improved when an iodine polarizing film is produced through stretching outside a dyeing bath, without stretching in the dyeing bath in the dyeing step.

To solve the above problems, therefore, the iodine polarizing film of the invention includes a polymer film and iodine adsorbed and oriented on the polymer film, wherein a iodine content of the polarizing film is within the range of 1.9 to 3% by weight per 2.85 mm$^3$, a single transmittance of the polarizing film is within the range of 43 to 45%, and a ratio (A2/A1) of a crossed absorbance A2 at a wavelength of 610 nm to a crossed absorbance A1 at a wavelength of 480 nm is 1.16 or less.

It is known that in general, the crossed absorbance at a wavelength of 480 nm is an index of the content of a trivalent iodine complex, and the crossed absorbance at a wavelength of 610 nm is an index of the content of a pentavalent iodine complex. The trivalent iodine complex, which is formed when iodine is adsorbed on the polymer film, has a high ability to absorb light in the short wavelength region (380-410 nm) of visible light (380-780 nm). According to the above feature, therefore, when the ratio (A2/A1) of the crossed absorbance A2 at a wavelength of 610 nm to the crossed absorbance A1 at a wavelength of 480 nm is set at 1.16 or less in the single transmittance range of 43 to 45% so that the trivalent iodine complex content is increased, the optical absorption in the short wavelength region (380-410 nm) of visible light (380-780 nm) can be increased. As a result, light leakage in the short wavelength region can be reduced.

In the stated above, the polymer film is preferably a polyvinyl alcohol film.

To solve the above problems, a method of the invention for producing an iodine polarizing film including a polymer film and iodine adsorbed and oriented thereon includes: a dyeing step of immersing the polymer film in an iodine-containing solution to adsorb iodine onto the polymer film; a stretching step of taking the polymer film out of the solution after the dyeing and then directly subjecting the polymer film to uniaxial stretching to a predetermined stretching ratio without heating it; and a crosslinking step of immersing the polymer film after the uniaxial stretching in a crosslinking bath to crosslink the polymer film.

In the method, the polymer film is dyed in the iodine-containing solution and taken out of the solution, before the stretching step is performed. In the stretching step, the polymer film is not heated with a heating roller, a heating oven or any other means. Therefore, the stretching step of this method differs from conventional dry stretching. This stretching step makes it possible to increase the content of a trivalent iodine complex in the polymer film on which iodine is adsorbed. The trivalent iodine complex has a high ability to absorb light in the short wavelength region (380-410 nm) of visible light (380-780 nm). Therefore, the stretching step makes it possible to produce a polarizing film with a high trivalent iodine complex content. Thus, the method makes it possible to produce an iodine polarizing film capable of reducing light leakage in the short wavelength region.

In dyeing step of the method, uniaxial stretching is preferably not performed on the polymer film in the iodine-containing solution. This prevents excessive adsorption of iodine on the polymer film, so that degradation in the orientation of the adsorbed iodine can be reduced. As a result, light leakage in the short wavelength region of visible light can be more effectively prevented.

In the stretching step of the method, the uniaxial stretching is preferably performed to a stretching ratio in the range of 1.2 to 1.8 times.

The polarizing plate of the invention includes the iodine polarizing film stated above and a transparent protective film provided on at least one surface of the iodine polarizing film. This feature makes it possible to provide a polarizing plate that has good optical properties and is prevented from causing light leakage in the short wavelength region (380-410 nm) of visible light (380-780 nm).

Effects of the Invention

The invention with the means described above brings about the advantageous effects as described below.

The iodine polarizing film of the invention, which has the feature that the ratio (A2/A1) of the crossed absorbance A2 at a wavelength of 610 nm to the crossed absorbance A1 at a wavelength of 480 nm is 1.16 or less in the single transmittance range of 43 to 45%, can have increased optical absorption in the short wavelength region of visible light and therefore can reduce light leakage in the short wavelength region. Therefore, an iodine polarizing film with good optical properties is provided.

The method of the invention for producing an iodine polarizing film, in which the polymer film taken out of the solution after the dyeing step is subjected to the stretching step, can increase the trivalent iodine complex content. Therefore, the method makes it possible to produce an iodine polarizing film that has good optical properties and reduces light leakage in the short wavelength region of visible light.

EMBODIMENTS FOR CARRYING OUT THE INVENTION

In an embodiment of the invention, the iodine polarizing film (hereinafter referred to as the "polarizing film"), which includes a polymer film and iodine adsorbed and oriented thereon, is an element capable of converting natural light or polarized light into desired polarized light. While the polarizing film used in an embodiment of the invention may be of any type, it is preferably a polarizing film capable of converting natural light or polarized light into linearly polarized light. When incident light contains two polarized components orthogonal to each other, such a polarizing film has the function of transmitting one of the polarized components and not transmitting the other by absorption, reflection, scattering, and the like.

For example, the polymer film is preferably a polyvinyl alcohol film (hereinafter referred to as a "PVA film"). The PVA film includes a polyvinyl alcohol-based resin, for example, which is obtained by saponifying a polyvinyl acetate-based resin. Examples of such a polyvinyl acetate-based resin include not only polyvinyl acetate, a vinyl acetate homopolymer, but also copolymers of monomers including vinyl acetate and any other monomer or monomers copolymerizable therewith. Examples of other monomers copolymerizable with vinyl acetate include unsaturated carboxylic acids, unsaturated sulfonic acids, olefins, and vinyl ethers.

The polyvinyl alcohol-based resin generally has a degree of polymerization in the range of 500 to 10,000, preferably in the range of 1,000 to 8,000, more preferably in the range of 1,400 to 7,000. When saponified, for example, the polyvinyl alcohol-based resin preferably has a degree of saponification of 75% by mole or more, more preferably 98% by mole or more, even more preferably 98.3% by mole or more, in view of solubility in water.

A PVA film made of a polyvinyl alcohol-based rein may be produced using any appropriate film forming method such as a flow casting method including casting a solution of raw materials in water or an organic solvent to form a film, a casting method, or an extrusion method. A PVA film with a retardation of 5 nm to 100 nm is preferably used. In order to form a polarizing film with in-plane uniformity, variations in the in-plane retardation of the PVA film should preferably be minimized as possible, and variations in the in-plane retardation of the PVA film used as a raw film should preferably be 10 nm or less, more preferably 5 nm or less as measured at a wavelength of 1,000 nm.

In an embodiment of the invention, the polarizing film has an iodine content of 1.9 to 3% by weight, preferably 2.2 to 3.0% by weight, more preferably 2.5 to 3.0% by weight per 2.85 $mm^3$. Iodine can form a trivalent iodine complex and a pentavalent iodine complex with a PVA film. The above content covers all forms of iodine contained in the polarizing film.

The polarizing film is such that when its single transmittance is in the range of 43 to 45%, the ratio (A2/A1) of the crossed absorbance A2 at a wavelength of 610 nm to the crossed absorbance A1 at a wavelength of 480 nm is 1.16 or less. If the ratio is more than 1.16, the pentavalent iodine complex content will be relatively high, so that the ability to absorb light in the short wavelength region (380-410 nm) of visible light (380 to 780 nm) may be relatively low, which may cause an increase in light leakage in the short wavelength region and cause a reduction in optical reliability. In view of the prevention of light leakage, the ratio is preferably 0.5 or more in the long wavelength region (700 to 780 nm) of visible light.

In the wavelength region where the single transmittance is from 43 to 45%, the crossed absorbance (A1) at 480 nm is an index of the trivalent iodine complex content, and the crossed absorbance (A2) at 610 nm is an index of the pentavalent iodine complex content. The single transmittance is indicated by the Y value corrected for visibility under the 2-degree visual field (C light source) according to JIS Z 8701 based on the result of the measurement at wavelengths of 380 nm to 780 nm. The crossed absorbances at wavelengths of 480 nm and 610 nm are obtained by measuring the crossed transmittance Tc of the polarizing film at 480 nm and 610 nm, respectively, and performing calculations according to the formula (crossed absorbance)=$-\mathrm{Log}_{10}$Tc.

The thickness of the polarizing film is generally, but not limited to, about 5 to about 80 μm. A transparent protective film or films may be placed on one or both sides of the polarizing film to form a polarizing plate (as described in detail below).

Next, a description is given of a method for producing the polarizing film according to an embodiment of the invention. In an embodiment of the invention, the polarizing film may be produced by any appropriate method including subjecting a PVA film as an initial raw material film to at least a dyeing step, a stretching step, and a crosslinking step sequentially. For example, a known conventional swelling step may be performed before the dyeing step.

In the swelling step, for example, the PVA film is immersed in a swelling bath filled with water. In this step, the PVA film is washed with water so that dirt and any anti-blocking agent are washed off from the surface of the PVA film, and the PVA film is allowed to swell, so that the effect of preventing unevenness such as uneven dyeing is expected. Glycerin, potassium iodide or the like may be added to the swelling bath as needed. Glycerin is preferably added at a concentration of 5% by weight or less, and potassium iodide is preferably added at a concentration of 10% by weight or less. The swelling bath preferably has a temperature in the range of 20 to 45° C., more preferably in the range of 25 to 40° C. The time period of immersion in the swelling bath is preferably from 2 to 180 seconds, more preferably from 10 to 150 seconds, in particular, preferably from 60 to 120 seconds. In the swelling bath, the PVA film may be stretched. In such a case, the stretching ratio (including the ratio of elongation by swelling) may be about 1.1 to about 3.5 times for the unstretched film.

In the dyeing step, the PVA film is immersed in an iodine-containing solution (dyeing bath) so that the iodine is adsorbed onto the PVA film. In this step, the PVA film is preferably not stretched in the dyeing bath, so that excessive adsorption of iodine on the PVA film can be prevented, which can reduce degradation in the orientation of the adsorbed iodine. As a result, light leakage can be prevented more effectively in the short wavelength region of visible light. However, as long as the above disadvantage does not occur, the PVA film may be stretched in the dyeing bath. When stretching is performed from such a point of view, the total stretching ratio is preferably about 5 to about 6.5 times.

A solution of iodine in a solvent may be used as the dyeing bath solution. While water is generally used as the solvent, an organic solvent compatible with water may be further added to the bath solution. The iodine concentration is preferably in the range of 0.010 to 10% by weight, more preferably in the range of 0.020 to 7% by weight, in particular, preferably in the range of 0.025 to 5% by weight.

To further increase the dyeing efficiency, an iodide is preferably added. Examples of such an iodide include potassium iodide, lithium iodide, sodium iodide, zinc iodide, aluminum iodide, lead iodide, copper iodide, barium iodide, calcium iodide, tin iodide, and titanium iodide. The content of the iodide in the dyeing bath is preferably from 0.010 to 10% by weight, more preferably from 0.10 to 5% by weight. In particular, potassium iodide is preferably added, and the ratio (weight ratio) between iodine and potassium iodide is preferably in the range of 1:5 to 1:100, more preferably in the range of 1:6 to 1:80, in particular, preferably in the range of 1:7 to 1:70.

The time period of immersion of the PVA film in the dyeing bath is preferably, but not limited to, in the range of 1 to 20 minutes, more preferably in the range of 2 to 10 minutes. The temperature of the dyeing bath is preferably in the range of 5 to 42° C., more preferably in the range of 10 to 35° C.

In the stretching step, the polymer film taken out of the dyeing bath is directly subjected to uniaxial stretching. In this step, the polymer film is not heated with a heating roller, a heating oven or any other means in contrast to known conventional dry stretching. This step may also be performed at room temperature (20 to 30° C.) and a relative humidity of 45 to 85% Rh. When this step is performed, the iodine-containing solution used in the dyeing step does not have to be removed from the polymer film.

In this step, the stretching ratio is preferably in the range of 1.15 to 1.8 times, more preferably in the range of 1.3 to 1.65 times for the PVA film just before the stretching. If the stretching ratio is less than 1.15 times, the effect of preventing light leakage in the short wavelength region may be insufficiently obtained, while if it is more than 1.8 time, satisfactory polarizing properties may not be obtained in some cases.

In the crosslinking step, for example, the PVA film is immersed in a crosslinking bath containing a crosslinking agent. The crosslinking agent to be used may be a known conventional material, examples of which include a boron compound such as boric acid or borax, glyoxal, and glutaraldehyde. These may be used singly or in combination of two or more. When these are used in combination of two or more, for example, a combination of boric acid and borax is preferred. The mixing ratio (molar ratio) between them is preferably in the range of 4:6 to 9:1, more preferably in the range of 5.5:4.5 to 7:3, most preferably 6:4.

A solution of the crosslinking agent in a solvent may be used as the crosslinking bath solution. While water is typically used as the solvent, an organic solvent compatible with water may be further added to the bath solution. The concentration of the crosslinking agent in the solution is preferably, but not limited to, in the range of 1 to 10% by weight, more preferably in the range of 2 to 6% by weight.

An iodide may be added to the crosslinking bath so that uniform optical properties can be obtained in the plane of the polarizing film. Examples of such an iodide include, but are not limited to, potassium iodide, lithium iodide, sodium iodide, zinc iodide, aluminum iodide, lead iodide, copper iodide, barium iodide, calcium iodide, tin iodide, and titanium iodide. The iodide content is preferably in the range of 0.05 to 15% by weight, more preferably in the range of 0.5 to 8% by weight. The iodides listed above may be used singly or in combination of two or more. When two or more of them are used in combination, a combination of boric acid and potassium iodide is preferred. The ratio (weight ratio) between boric acid and potassium iodide is preferably in the range of 1:0.1 to 1:3.5, more preferably in the range of 1:0.5 to 1:2.5.

The temperature of the crosslinking bath is generally in the range of 20 to 70° C., and the time period of immersion of the PVA film is generally in the range of 1 second to 15 minutes, preferably in the range of 5 seconds to 10 minutes. Alternatively, a method of applying or spraying a crosslinking agent-containing solution may be used in the crosslinking process. In the crosslinking bath, the PVA film may be stretched, and in such a case, the total stretching ratio is preferably about 1.1 to about 4.0 times.

In an embodiment of the invention, if necessary, a washing step and a drying step may be sequentially performed. In the washing step, for example, the PVA film may be immersed in an aqueous washing bath solution so that unnecessary residues such as boric acid deposited in the preceding process can be washed away. A salt of a Group 2 element may be added to the aqueous solution, and, for example, an iodide is preferably used as such a salt. Examples of such an iodide include potassium iodide, lithium iodide, sodium iodide, zinc iodide, aluminum iodide, lead iodide, copper iodide, barium iodide, calcium iodide, tin iodide, and titanium iodide. When the Group 2 element salt is added to the washing bath, its concentration is generally from 2.2 to 3.8% by weight, preferably from 2.7 to 3.3% by weight. The temperature of the washing bath is preferably from 10 to 60° C., more preferably from 15 to 40° C. The washing step may be performed any number of times such as twice or more. Each washing bath may vary in the type and concentration of the additive.

When the PVA film is pulled out of the swelling, crosslinking, or washing bath, a known conventional draining roller such as a pinch roller may be used to prevent dripping, or excess water may be removed by a method of blowing off the liquid with an air knife.

The drying step may be performed using an appropriate method such as natural drying, air drying, or drying by heating, in general, preferably using drying by heating. When drying by heating is performed, the drying temperature is preferably from about 20 to about 80° C., and the drying time is preferably from about 1 to about 10 minutes.

The final total stretching ratio, which is reached when the polarizing film is obtained by performing the above steps, respectively, is preferably 5.0 times or more, more preferably from 5.5 to 6.5 times for the initial raw PVA film. If the final total stretching ratio is less than 5.0 times, it may be difficult to obtain a polarizing film with a high degree of polarization. When the total stretching ratio is 6.5 times or less, easy breaking of the PVA film can be prevented.

In an embodiment of the invention, the polarizing film obtained by the above production method preferably has a single transmittance in the range of 43% to 45%, more preferably in the range of 43.5% to 45.0% when a single piece of the polarizing film is measured.

A transparent protective film may be provided on at least one side of the polarizing film. A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizing film with the adhesive layer, but thermosetting resins or ultraviolet curing resins such as (meth)acrylic, urethane, acrylic urethane, epoxy, or silicone resins may be used to other side of the polarizing film for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of the polarizing film, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have thickness direction retardation (Rth) of about 60 nm or less, while having in-plane retardation (Re) of almost zero.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrogenated products thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with in-plane retardation (Re) of almost zero and thickness direction retardation (Rth) of almost zero.

Any appropriate (meth)acrylic resin may be used as long as the advantages of the invention are not reduced. Examples of such a (meth)acrylic resin include poly(meth)acrylate such as poly(methyl methacrylate), methyl methacrylate-(meth) acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth) acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, and 2005-146084.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

The transparent protective film may be subjected to surface modification treatment before it is applied with the adhesive. Specific examples of such treatment include corona treatment, plasma treatment, primer treatment, saponification treatment, and coupling agent treatment.

A hard coat layer may be prepared, or antireflection processing layer, processing aiming at sticking prevention, diffusion or anti glare may be performed onto the face on which the polarizing film of the above described transparent protective film has not been adhered.

In addition, the above-mentioned antireflection layer, sticking prevention layer, diffusion layer, anti glare layer, etc. may be built in the protective film itself, and also they may be prepared as an optical layer different from the protective film.

The polarizing plate of the invention is manufactured by bonding the transparent protective film and the polarizing film together with the adhesive. The manufacturing method includes the steps of: applying the adhesive to the adhesive layer-receiving surface of the polarizing film and/or the adhesive layer-receiving surface of the transparent protective film; and bonding the polarizing film and the transparent protective film together with the polarizing plate adhesive interposed therebetween.

In an embodiment of the invention, a polarizing plate may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In an embodiment of the invention, the polarizing plate is preferably used in a variety of image displays such as liquid crystal displays and organic electroluminescence devices. When used in a liquid crystal display, the polarizing plates according to an embodiment of the invention are placed on the front and back surfaces of a liquid crystal cell so that their light transmission axes are perpendicular to each other. This arrangement reduces light leakage in the visible wavelength region and makes it possible to obtain a liquid crystal display device that is prevented from causing discoloration on the display screen. The liquid crystal cell to be used may be of any type such as a TN, STN, π, VA, or IPS type.

EXAMPLES

Preferred examples of the invention are illustratively described in detail below. It will be understood that the materials, the contents of the materials, and other features described in the examples are not intended to limit the scope of the invention, unless otherwise stated.

Example 1

An iodine polarizing film according to this example was prepared by subjecting a polyvinyl alcohol (PVA) film with a degree of polymerization of 2,400, a thickness of 75 μm, and a width of 50 mm (VF-PS7500 (trade name) manufactured by KURARAY CO., LTD.) sequentially to the steps described below.
<Swelling Step>
The PVA film was fed to a swelling bath filled with pure water at 30° C. and immersed in the pure water for 30 seconds so that it was allowed to swell. The PVA film was also uniaxially stretched to get a stretching ratio of 2.2 times.
<Dyeing Step>
The PVA film was fed to a dyeing bath filled with an iodine-containing dyeing solution at 30° C. containing 10% by weight of iodine and immersed in the iodine-containing dyeing solution for 5 seconds so that it was dyed. In this step, no stretching process was performed.
<Stretching Step>
After the dyeing, the PVA film was taken out of the dyeing bath and uniaxially stretched outside the bath (at a temperature of 25° C. and a relative humidity of 45% RH). The stretching ratio was 3.3 times for the initial unstretched PVA film (the stretching ratio outside the bath was 1.48 times).
<Crosslinking Step>
The PVA film was fed to a crosslinking bath filled with an aqueous boric acid solution at 30° C. containing 3% by weight of boric acid and 3% by weight of potassium iodide. While immersed in the aqueous boric acid solution for 28 seconds, the PVA film was uniaxially stretched to get a stretching ratio of 3.6 times the initial PVA film so that it was crosslinked. Subsequently, the PVA film was uniaxially stretched to get a stretching ratio of 5.92 times for the initial PVA film while it was immersed for 60 seconds in a crosslinking bath filled with an aqueous boric acid solution at 60° C. containing 4% by weight of boric acid and 5% by weight of potassium iodide.
<Washing Step>
The PVA film was fed to a washing bath filled with an aqueous potassium iodide solution at 30° C. containing 3% by weight of potassium iodide and immersed in the aqueous potassium iodide solution for 10 seconds so that a water washing process was performed.
The PVA film was taken out of the washing bath and dried using an oven. The drying conditions were a drying temperature of 60° C. and a time period of 4 minutes required for passing through the oven. After this step, the polarizing film according to this example was obtained.

Comparative Example 1

Using the same PVA film as in Example 1, an iodine polarizing film according to this comparative example was produced by sequentially performing the steps described below.
<Swelling Step>
The PVA film was fed to a swelling bath filled with pure water at 30° C. and immersed in the pure water for 30 seconds so that it was allowed to swell. The PVA film was also uniaxially stretched to get a stretching ratio of 2.2 times.
<Dyeing Step>
The PVA film was fed to a dyeing bath filled with an iodine-containing dyeing solution at 30° C. containing 3.8% by weight of iodine and immersed in the iodine-containing dyeing solution for 27 seconds so that it was dyed with uniaxially stretching. The stretching ratio was 3.3 times for the initial unstretched PVA film.
<Crosslinking Step>
The PVA film was fed to a crosslinking bath filled with an aqueous boric acid solution at 30° C. containing 3% by weight of boric acid and 3% by weight of potassium iodide. While immersed in the aqueous boric acid solution for 28 seconds, the PVA film was uniaxially stretched to get a stretching ratio of 3.6 times the initial PVA film so that it was crosslinked. Subsequently, the PVA film was uniaxially stretched to get a stretching ratio of 5.92 times for the initial PVA film while it was immersed for 60 seconds in a crosslinking bath filled with an aqueous boric acid solution at 60° C. containing 4% by weight of boric acid and 5% by weight of potassium iodide.
<Washing Step>
The PVA film was fed to a washing bath filled with an aqueous potassium iodide solution at 30° C. containing 3% by weight of potassium iodide and immersed in the aqueous potassium iodide solution for 10 seconds so that a water washing process was performed.
The PVA film was taken out of the washing bath and dried using an oven. The drying conditions were a drying temperature of 60° C. and a time period of 4 minutes required for passing through the oven. After this step, the polarizing film according to this comparative example was obtained.

Example 2

Using the same PVA film as in Example 1, an iodine polarizing film according to this example was produced by sequentially performing the steps described below.
<Swelling Step>
The PVA film was fed to a swelling bath filled with pure water at 30° C. and immersed in the pure water for 30 seconds so that it was allowed to swell. The PVA film was also uniaxially stretched to get a stretching ratio of 2.2 times.
<Dyeing Step>
The PVA film was fed to a dyeing bath filled with an iodine-containing dyeing solution at 30° C. containing 9% by weight of iodine and immersed in the iodine-containing dyeing solution for 5 seconds so that it was dyed. The PVA film was also uniaxially stretched to get a stretching ratio of 2.4 times.
<Stretching Step>
After the dyeing, the PVA film was taken out of the dyeing bath and uniaxially stretched outside the bath (at a temperature of 25° C. and a relative humidity of 45% RH). The stretching ratio was 3.3 times for the initial unstretched PVA film (the stretching ratio outside the bath was 1.4 times).
<Crosslinking Step>
The PVA film was fed to a crosslinking bath filled with an aqueous boric acid solution at 30° C. containing 3% by weight of boric acid and 3% by weight of potassium iodide. While immersed in the aqueous boric acid solution for 28 seconds, the PVA film was uniaxially stretched to get a stretching ratio of 3.6 times the initial PVA film so that it was crosslinked. Subsequently, the PVA film was uniaxially stretched to get a stretching ratio of 5.92 times for the initial PVA film while it was immersed for 60 seconds in a crosslinking bath filled with an aqueous boric acid solution at 60° C. containing 4% by weight of boric acid and 5% by weight of potassium iodide.
<Washing Step>

The PVA film was fed to a washing bath filled with an aqueous potassium iodide solution at 30° C. containing 3% by weight of potassium iodide and immersed in the aqueous potassium iodide solution for 10 seconds so that a water washing process was performed.

The PVA film was taken out of the washing bath and dried using an oven. The drying conditions were a drying temperature of 60° C. and a time period of 4 minutes required for passing through the oven. After this step, the polarizing film according to this example was obtained.

Example 3

Using the same PVA film as in Example 1, an iodine polarizing film according to this example was produced by sequentially performing the steps described below.
<Swelling Step>

The PVA film was fed to a swelling bath filled with pure water at 30° C. and immersed in the pure water for 25 seconds so that it was allowed to swell. The PVA film was also uniaxially stretched to get a stretching ratio of 2.0 times.
<Dyeing Step>

The PVA film was fed to a dyeing bath filled with an iodine-containing dyeing solution at 30° C. containing 10.5% by weight of iodine and immersed in the iodine-containing dyeing solution for 5 seconds so that it was dyed. In this step, no stretching process was performed.
<Stretching Step>

After the dyeing, the PVA film was taken out of the dyeing bath and uniaxially stretched outside the bath (at a temperature of 25° C. and a relative humidity of 45% RH). The stretching ratio was 3.3 times for the initial unstretched PVA film (the stretching ratio outside the bath was 1.64 times).
<Crosslinking Step>

The PVA film was fed to a crosslinking bath filled with an aqueous boric acid solution at 30° C. containing 3% by weight of boric acid and 3% by weight of potassium iodide. While immersed in the aqueous boric acid solution for 28 seconds, the PVA film was uniaxially stretched to get a stretching ratio of 3.6 times the initial PVA film so that it was crosslinked. Subsequently, the PVA film was uniaxially stretched to get a stretching ratio of 5.92 times for the initial PVA film while it was immersed for 60 seconds in a crosslinking bath filled with an aqueous boric acid solution at 60° C. containing 4% by weight of boric acid and 5% by weight of potassium iodide.
<Washing Step>

The PVA film was fed to a washing bath filled with an aqueous potassium iodide solution at 30° C. containing 3% by weight of potassium iodide and immersed in the aqueous potassium iodide solution for 10 seconds so that a water washing process was performed.

The PVA film was taken out of the washing bath and dried using an oven. The drying conditions were a drying temperature of 60° C. and a time period of 4 minutes required for passing through the oven. After this step, the polarizing film according to this example was obtained.

Comparative Example 2

Using the same PVA film as in Example 1, an iodine polarizing film according to this comparative example was produced by sequentially performing the steps described below.
<Swelling Step>

The PVA film was fed to a swelling bath filled with pure water at 30° C. and immersed in the pure water for 25 seconds so that it was allowed to swell. The PVA film was also uniaxially stretched to get a stretching ratio of 2.0 times.
<Dyeing Step>

The PVA film was fed to a dyeing bath filled with an iodine-containing dyeing solution at 30° C. containing 3.8% by weight of iodine and immersed in the iodine-containing dyeing solution for 32 seconds so that it was dyed with uniaxially stretching. The stretching ratio was 3.3 times for the initial unstretched PVA film.
<Crosslinking Step>

The PVA film was fed to a crosslinking bath filled with an aqueous boric acid solution at 30° C. containing 3% by weight of boric acid and 3% by weight of potassium iodide. While immersed in the aqueous boric acid solution for 28 seconds, the PVA film was uniaxially stretched to get a stretching ratio of 3.6 times the initial PVA film so that it was crosslinked. Subsequently, the PVA film was uniaxially stretched to get a stretching ratio of 5.92 times for the initial PVA film while it was immersed for 60 seconds in a crosslinking bath filled with an aqueous boric acid solution at 60° C. containing 4% by weight of boric acid and 5% by weight of potassium iodide.
<Washing Step>

The PVA film was fed to a washing bath filled with an aqueous potassium iodide solution at 30° C. containing 3% by weight of potassium iodide and immersed in the aqueous potassium iodide solution for 10 seconds so that a water washing process was performed.

The PVA film was taken out of the washing bath and dried using an oven. The drying conditions were a drying temperature of 60° C. and a time period of 4 minutes required for passing through the oven. After this step, the polarizing film according to this comparative example was obtained.

Example 4

Using the same PVA film as in Example 1, an iodine polarizing film according to this example was produced by sequentially performing the steps described below.
<Swelling Step>

The PVA film was fed to a swelling bath filled with pure water at 30° C. and immersed in the pure water for 25 seconds so that it was allowed to swell. The PVA film was also uniaxially stretched to get a stretching ratio of 2.0 times.
<Dyeing Step>

The PVA film was fed to a dyeing bath filled with an iodine-containing dyeing solution at 30° C. containing 10.5% by weight of iodine and immersed in the iodine-containing dyeing solution for 5 seconds so that it was dyed. In this step, no stretching process was performed.
<Stretching Step>

After the dyeing, the PVA film was taken out of the dyeing bath and uniaxially stretched outside the bath (at a temperature of 25° C. and a relative humidity of 45% RH). The stretching ratio was 2.5 times for the initial unstretched PVA film (the stretching ratio outside the bath was 1.25 times).
<Crosslinking Step>

The PVA film was fed to a crosslinking bath filled with an aqueous boric acid solution at 30° C. containing 3% by weight of boric acid and 3% by weight of potassium iodide. While immersed in the aqueous boric acid solution for 28 seconds, the PVA film was uniaxially stretched to get a stretching ratio of 3.6 times the initial PVA film so that it was crosslinked. Subsequently, the PVA film was uniaxially stretched to get a stretching ratio of 5.92 times for the initial PVA film while it was immersed for 60 seconds in a crosslinking bath filled with an aqueous boric acid solution at 60° C. containing 4% by weight of boric acid and 5% by weight of potassium iodide.

<Washing Step>

The PVA film was fed to a washing bath filled with an aqueous potassium iodide solution at 30° C. containing 3% by weight of potassium iodide and immersed in the aqueous potassium iodide solution for 10 seconds so that a water washing process was performed.

The PVA film was taken out of the washing bath and dried using an oven. The drying conditions were a drying temperature of 60° C. and a time period of 4 minutes required for passing through the oven. After this step, the polarizing film according to this example was obtained.

Comparative Example 3

Using the same PVA film as in Example 1, an iodine polarizing film according to this comparative example was produced by sequentially performing the steps described below.

<Swelling Step>

The PVA film was fed to a swelling bath filled with pure water at 30° C. and immersed in the pure water for 25 seconds so that it was allowed to swell. The PVA film was also uniaxially stretched to get a stretching ratio of 2.0 times.

<Dyeing Step>

The PVA film was fed to a dyeing bath filled with an iodine-containing dyeing solution at 30° C. containing 4.5% by weight of iodine and immersed in the iodine-containing dyeing solution for 13 seconds so that it was dyed with uniaxially stretching. The stretching ratio was 2.5 times for the initial unstretched PVA film.

<Crosslinking Step>

The PVA film was fed to a crosslinking bath filled with an aqueous boric acid solution at 30° C. containing 3% by weight of boric acid and 3% by weight of potassium iodide. While immersed in the aqueous boric acid solution for 28 seconds, the PVA film was uniaxially stretched to get a stretching ratio of 3.6 times the initial PVA film so that it was crosslinked. Subsequently, the PVA film was uniaxially stretched to get a stretching ratio of 5.92 times for the initial PVA film while it was immersed for 60 seconds in a crosslinking bath filled with an aqueous boric acid solution at 60° C. containing 4% by weight of boric acid and 5% by weight of potassium iodide.

<Washing Step>

The PVA film was fed to a washing bath filled with an aqueous potassium iodide solution at 30° C. containing 3% by weight of potassium iodide and immersed in the aqueous potassium iodide solution for 10 seconds so that a water washing process was performed.

The PVA film was taken out of the washing bath and dried using an oven. The drying conditions were a drying temperature of 60° C. and a time period of 4 minutes required for passing through the oven. After this step, the polarizing film according to this comparative example was obtained.

(Single Transmittance)

The single transmittance of the polarizing film according to each of the examples and the comparative examples was indicated by the Y value corrected for visibility under the 2-degree visual field (C light source) according to JIS Z 8701 (1982) using an integrating sphere spectrophotometer (V7100 manufactured by JASCO Corporation). The results are shown in Table 1.

(Crossed Absorbances)

The crossed absorbances at 480 nm and 610 nm were determined by measuring the crossed transmittances Tc of the polarizing film at 480 nm and 610 nm, respectively, using the above spectrophotometer and then performing calculations according to the formula (crossed absorbance)=$-\text{Log}_{10}\text{Tc}$, respectively.

(Crossed Transmittance)

For each polarizing film, the crossed transmittance at 410 nm was measured using the above spectrophotometer.

(Iodine Content)

The content of iodine in the iodine polarizing film per 2.85 mm$^3$ was determined using an X-ray fluorescence analyzer (ZSX100e (trade name) manufactured by Rigaku Corporation).

(Results)

As is evident from Table 1 below, the iodine polarizing film according to Example 1 exhibited a lower crossed transmittance at 410 nm than the iodine polarizing film according to Comparative Example 1 in which stretching was performed not in the stretching step but in the dyeing bath in the dyeing step. Similarly, the crossed transmittance at 410 nm was lower for the iodine polarizing film according to Example 2 than that according to Comparative Example 2 and lower for the iodine polarizing film according to Example 3 than that according to Comparative Example 3. The results show that a polarizing plate including the polarizing film according to each of Examples 1 to 3 can reduce light leakage in the short wavelength region of visible light.

TABLE 1

| | Iodine content (wt %) | Single transmittance (%) | Crossed absorbance A1 at 480 nm | Crossed absorbance A2 at 610 nm | A2/A1 | Stretching method | Stretching ratio (times) in the air | Total stretching ratio (times) | Crossed transmittance at 410 nm |
|---|---|---|---|---|---|---|---|---|---|
| Example 1 | 2.62 | 44.24 | 3.426 | 3.959 | 1.156 | In the air | 1.48 (3.3) | 5.92 | 0.358 |
| Example 2 | 2.6 | 44.2 | 3.395 | 3.93 | 1.158 | In the dyeing bath and in the air | 1.4 (3.3) | 5.92 | 0.4 |
| Comparative Example 1 | 2.6 | 44.22 | 3.312 | 3.932 | 1.187 | In the dyeing bath | — | 5.92 | 0.453 |
| Example 3 | 2.66 | 43.97 | 3.869 | 4.39 | 1.121 | In the air | 1.64 (3.3) | 5.92 | 0.135 |
| Comparative Example 2 | 2.65 | 43.97 | 3.52 | 4.1 | 1.165 | In the dyeing bath | — | 5.92 | 0.314 |

TABLE 1-continued

|  | Iodine content (wt %) | Single transmittance (%) | Crossed absorbance A1 at 480 nm | Crossed absorbance A2 at 610 nm | A2/A1 | Stretching method | Stretching ratio (times) in the air | Total stretching ratio (times) | Crossed transmittance at 410 nm |
|---|---|---|---|---|---|---|---|---|---|
| Example 4 | 2.55 | 44.04 | 3.84 | 3.5 | 0.9 | In the air | 1.25 (2.5) | 5.92 | 0.3 |
| Comparative Example 3 | 2.56 | 44.0 | 3.0 | 3.54 | 1.18 | In the dyeing bath | — | 5.92 | 0.45 |

The invention claimed is:

1. A method for producing an iodine polarizing film comprising a polymer film and iodine adsorbed and oriented on the polymer film, comprising:
   a dyeing step of immersing the polymer film in an iodine-containing solution to adsorb iodine onto the polymer film;
   a stretching step of taking the polymer film out of the iodine-containing solution after the dyeing and then directly subjecting the polymer film to uniaxial stretching in the air to a stretching ratio of 1.2 to 1.8 times without heating the polymer film; and
   a crosslinking step of immersing the polymer film after the uniaxial stretching in a crosslinking bath to crosslink the polymer film.

2. The method according to claim 1,
   wherein the polymer film is not uniaxially stretched in the iodine-containing solution in the dyeing step.

3. The method according to claim 1,
   wherein in the dyeing step, the polymer film is immersed for a time period of 1 minute to 20 minutes in the iodine-containing solution at a temperature of 5 to 42° C.

4. The method according to claim 1,
   wherein in the dyeing step, the iodine-containing solution has an iodine concentration of 0.010 to 10% by weight.

5. The method according to claim 1,
   wherein in the dyeing step, the iodine-containing solution contains an iodide at a concentration of 0.010 to 10% by weight.

6. The method according to claim 1,
   wherein in the crosslinking step, the polymer film after the uniaxial stretching is immersed for a time period of 1 second to 15 minutes in the crosslinking bath at a temperature of 20° C. to 70° C.

7. The method according to claim 1,
   wherein in the crosslinking step, the crosslinking bath has a crosslinking agent concentration of 1 to 10% by weight.

8. The method according to claim 1,
   wherein in the crosslinking step, the crosslinking bath contains an iodide at a concentration of 0.05 to 15% by weight.

9. The method according to claim 1, further comprising a washing step of immersing the polymer film in a washing bath to wash the polymer film after the crosslinking step.

10. The method according to claim 9, further comprising a drying step of heating the polymer film under conditions of a drying temperature of 20° C. to 80° C. and a drying time of 1 minute to 10 minutes after the washing step.

* * * * *